United States Patent
Rouis

[11] 3,762,239
[45] Oct. 2, 1973

[54] WHEEL TURNING DEVICE

[76] Inventor: Robert J. Rouis, 3353 Shasta Drive, San Mateo, Calif. 94403

[22] Filed: Mar. 2, 1972

[21] Appl. No.: 231,158

Related U.S. Application Data

[63] Continuation-in-part of Ser. No. 6,337, Jan. 28, 1970, Pat. No. 3,648,539.

[52] U.S. Cl. ................................. 74/494, 74/202
[51] Int. Cl. ............................................ B62d 1/22
[58] Field of Search ..................... 74/202, 494, 495

[56] References Cited
UNITED STATES PATENTS

| | | | |
|---|---|---|---|
| 2,805,585 | 9/1957 | Besserman | 180/79.1 UX |
| 2,928,291 | 3/1960 | Wilkerson | 74/494 |
| 3,003,363 | 10/1961 | DeHart | 74/494 |

Primary Examiner—Milton Kaufman
Assistant Examiner—Frank H. McKenzie, Jr.
Attorney—Julian Caplan

[57] ABSTRACT

In wheel aligning and other vehicle repair jobs it is frequently necessary to turn the wheels of the vehicle. The wheels are most easily turned by use of the steering wheel, but such turning requires either that the mechanic move from the front of the vehicle to a position to reach the steering wheel or use an assistant. This device is electrically operated and is controlled from a position at the front wheel. A pair of rollers is mounted on a platform so that they bear against the underside of the steering wheel. The rollers are driven by one or more reversible motors powered either from the vehicle battery or utility lines. The motors are controlled by a reversing switch at the front wheel or by remote control.

3 Claims, 4 Drawing Figures

PATENTED OCT 2 1973  3,762,239
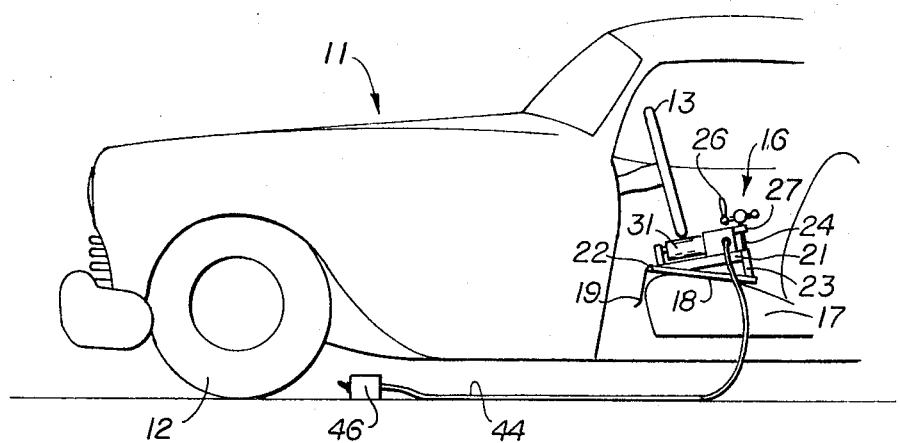
Fig. 1
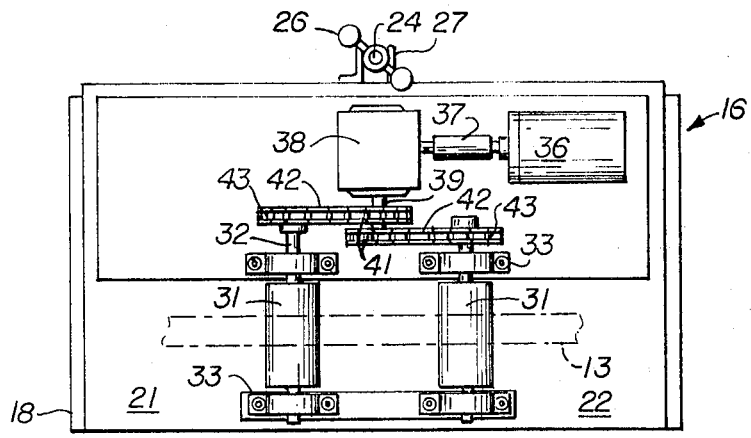
Fig. 2
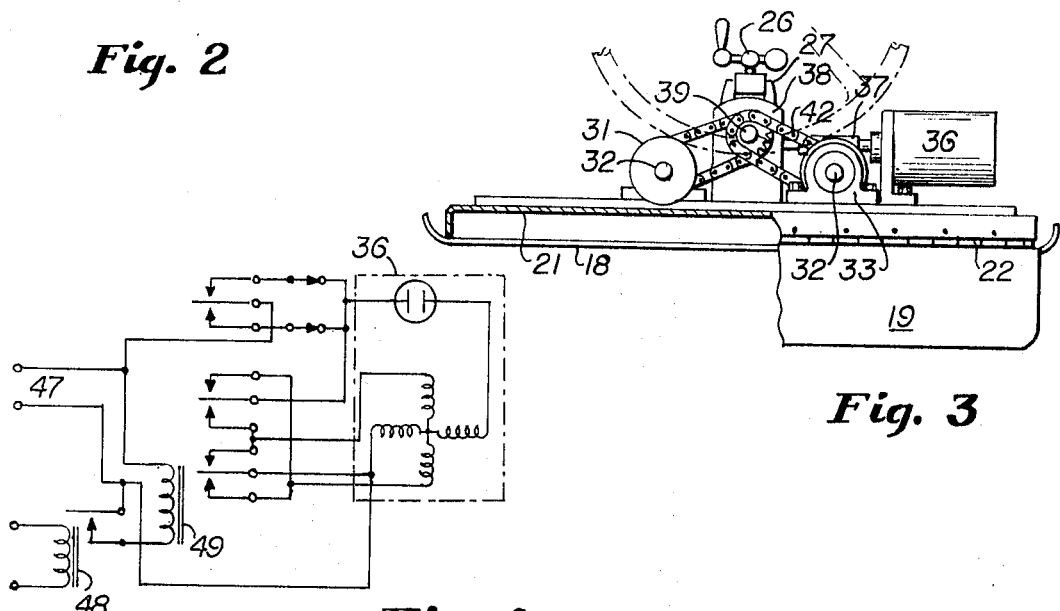
Fig. 3
Fig. 4

WHEEL TURNING DEVICE

This invention is a continuation-in-part of copending application Ser. No. 6337 filed Jan. 28, 1970, (now U.S. Pat. No. 3,648,539).

This invention relates to a new and improved wheel turning device. More particularly, the invention relates to an electrically operated remote-controlled wheel turner. In testing and repairing the alignment and other functions of the front wheels of a vehicle, it is necessary for the workman to turn the front wheels from time to time. Heretofore, this has been accomplished either by manually turning the steering wheel, which requires either the services of an assistant or that the workman leave his position at the front wheel and reach into the interior of the vehicle, or has required considerable physical effort of the workman in moving the vehicle wheel at its location, which requires that the operator stand in order to brace himself against the fender or other stationary portion of the car. The present invention makes it possible for the workman to turn the vehicle wheels without using appreciable physical effort and without leaving his working position.

Accordingly, a principal purpose of the present invention is to provide a compact, readily portable device which fits on the vehicle seat and is installed with rubber rollers engaging the bottom of the steering wheel, the rollers being motor controlled from a remote position at the vehicle wheel. Thus, a principal feature of the invention is the fact that the device is easily installed and removed, and there is no need to make any mechanical connection between the device and the steering wheel.

A principal advantage of the invention is the reduction in time required to turn the vehicle wheels, and thus the reduction in the cost of wheel aligning and other operations of a similar nature.

Another feature of the invention is the considerable reduction in physical effort required to turn the vehicle wheels. Where there is power steering, or in other installations where the ratio between the degree of turning of the vehicle wheel and the degree of turning of the steering wheel is high, the force required to turn the wheels by applying a turning moment to the vehicle wheels themselves is extremely high. This inconvenience is eliminated by the present invention.

An advantage of the present invention is the fact that the position of the rollers which engage the bottom of the vehicle wheel is readily adjustable for different vehicle conditions. In other words, the device of the present invention is almost universal in its application.

Another advantage of the invention is the ease with which it may be installed. There is no physical attachment required. After the device is placed on the vehicle seat, a crank is turned to bring the two rubber rollers into engagement with the bottom of the steering wheel. The pressure of the rollers can be controlled so that in normal situations the vehicle wheel is turned; but if an obstruction is encountered, the rollers slip.

Other objects of the present invention will become apparent upon reading the following specification and referring to the accompanying drawings in which similar characters of reference represent corresponding parts in each of the several views.

In the drawings:

FIG. 1 is a side elevational view of a vehicle with the device installed.

FIG. 2 is a top plan of the device in enlarged scale.

FIG. 3 is an elevational view of the structure of FIG. 2.

FIG. 4 is a wiring diagram.

Vehicle 11 has front wheels 12 which are normally turned by the steering wheel 13 through a conventional steering mechanism (not shown). Wheel 13 is located in the driver compartment of the vehicle immediately above the front seat 17. The present invention comprises an apparatus 16 which is installed on seat 17 below the wheel 13.

The turning device 16 has a base 18 which rest on the top of seat 17 and has a lip 19 which extends over the front edge of the seat 17 and prevents the base 18 from sliding rearwardly. Platform 21 is connected by hinge 22 to the forward edge of base 18 by a piano-type hinge 22 or other convenient means. A substantially vertical nut 23 is pivotally connected to the ear edge of base 18 and receives a screw 24 which is held in a guide 27 on platform 21 and has a handle 26 which is used to turn the screw. As is best shown in FIG. 1, by turning handle 26 the angle of platform 21 relative to base 18 may be adjusted in order to bring the device 16 into position bearing against the underside of steering wheel 13.

Rotatably mounted on platform 21 is a pair of rollers 31 having shafts 32 which extend longitudinally of the vehicle and are mounted by means of pillow blocks 33 on platform 21. The two rollers 31 engage wheel 13. Rollers 31 are turned by reversible electric motor 36 which has its shaft coupled by coupling 37 to the input shaft of a right-angle gear reduction box 38. The output shaft 39 of box 38 carries a pair of sprockets 41 which are connected by chains 42 to sprockets 43 on the ends of shafts 32.

A reversing switch 46 is mounted on the end of a long cord 44 so that the switch 46 may be installed near where the workman is working on the wheel 12. Switch 46 has three positions, namely, an open position which stops the motor 36 and two operative positions which drive the motor in opposite directions. Switch 46 is a pulsing switch and may, in fact, have a sound-actuator at the wheel 12 and no cord — similar to remote television receiver controls used in residences. Directing attention to FIG. 4, the pulse from the wheel 12 site latches relay 48 closed, thus energizing triple pole relay 49 from AC source 47. A second pulse unlatches relay 48. When energized the first time, the contact arms 51a, c contact the lower contacts; whereas, when energized the second time, the arms contact the other set of contacts. This controls the direction of motor 36, as shown.

In use, the base 18 is installed on the seat 17 and the handle 26 turned so that the rollers 31 engage the wheel 13 sufficiently tightly so as to turn the wheel 13 but not so tight that the wheels 12 are turned to the limit of their travel. When this or another obstruction is encountered, the rollers 31 slip. Thus damage to the steering mechanism or device 16 is avoided. The cord 44 is then extended to a working position near the wheels 12 and the workman adjusts the switch 46 to turn the wheel 13 in the proper direction. Between turnings, the switch 46 is in open position.

What is claimed is:

1. A device to turn a vehicle steering wheel and thereby to turn the front wheels of the vehicle comprising a mounting platform adapted to fit on top of the driver's seat of said vehicle below the steering wheel, a pair of rollers each having a resilient surface adapted to fit against and to turn said steering wheel, said rollers mounted on said platform with their axes of revolution parallel to the normal direction of movement of the vehicle, a base shaped to fit on the seat of the vehicle below the steering wheel, hinge means pivotally connecting said base and platform together, means connected to said platform and said base for adjusting the angle of said platform relative to said base and thereby to bring said rollers into contact with said steering wheel, a reversible motor on said platform, and drive means driving said rollers from said motor.

2. A device according to claim 1 which further comprises a source of electric power for said motor, a switch between said source and said motor to drive said motor in either direction and to stop said motor, a long electric cord having said switch at its outer end and connected at its inner end to said source and said motor, said cord of sufficient length to reach from the steering wheel to either of the front wheels of the vehicle.

3. A device according to claim 1 in which said drive means comprises a gear-reduction drive having input and output shafts, said motor connected to said input shaft, a pair of sprockets on said output shaft, a second pair of sprockets rotatable with said rollers and chains interconnecting said sprockets.

* * * * *